United States Patent [19]
Voegeli

[11] 3,978,176
[45] Aug. 31, 1976

[54] SPARGER
[75] Inventor: Douglas W. Voegeli, Shoreview, Minn.
[73] Assignee: Minnesota Mining and Manufacturing Company, St. Paul, Minn.
[22] Filed: Jan. 7, 1975
[21] Appl. No.: 539,088

Related U.S. Application Data
[63] Continuation-in-part of Ser. No. 286,112, Sept. 5, 1972, abandoned.

[52] U.S. Cl. .......................... 261/122; 23/258.5 B; 261/DIG. 7; 261/DIG. 28; 264/128
[51] Int. Cl.[2] .......................................... B01F 3/04
[58] Field of Search ........ 261/122, DIG. 7, DIG. 28; 117/132 B; 156/3; 264/128; 23/258.5 A, 258.5 B, 258.5 R; 210/446, 496, 510

[56] References Cited
UNITED STATES PATENTS

| | | | |
|---|---|---|---|
| 1,988,478 | 1/1935 | Broadwell et al. | 261/122 X |
| 2,218,635 | 10/1940 | Borge | 261/122 |
| 2,774,585 | 12/1956 | Wirts | 261/122 |
| 3,166,615 | 1/1965 | Farrell | 264/128 X |
| 3,175,935 | 3/1965 | Vanstrum | 156/3 |
| 3,357,564 | 12/1967 | Medford, Jr. et al. | 210/496 X |
| 3,538,020 | 11/1970 | Heskett et al. | 210/496 |
| 3,603,509 | 9/1971 | Nechine | 261/122 X |
| 3,701,676 | 10/1972 | Bader et al. | 117/132 BX |
| 3,707,401 | 12/1972 | Jarema et al. | 117/132 B |
| 3,753,500 | 8/1973 | Voegeli | 210/446 |
| 3,803,279 | 4/1974 | Bailey, Jr. et al. | 264/128 X |
| 3,825,640 | 7/1974 | Maierson | 264/128 X |

OTHER PUBLICATIONS
Kappelmeier, C.P.A., *Chemical Analysis of Resin-Based Coating Materials*, Interscience Publishers, Inc., New York, copyright 1959, pp. 26, 27.

Primary Examiner—Tim R. Miles
Assistant Examiner—Richard L. Chiesa
Attorney, Agent, or Firm—Alexander, Sell, Steldt & DeLaHunt

[57] ABSTRACT
A sparger useful for producing bubbles of uniform size in liquids is formed from a body comprised of a cured, thermosetting resin matrix enclosing spherical particles of substantially uniform size and containing numerous interconnecting passageways formed by the interstices between said enclosed particles.

6 Claims, 2 Drawing Figures

SPARGER

RELATED APPLICATIONS

This application is a continuation in part of my copending application Ser. No. 286,112 filed Sept. 5, 1972 now abandoned.

BACKGROUND OF THE INVENTION

The technique of using porous materials as spargers to aerate fluids, such as the addition of carbon dioxide to beverages or the addition of oxygen to blood for medical purposes, is known in the art. It is known to consolidate materials such as refractory particles or thermoplastic spheres or sintered, powdered metal to form a sparger suitable for aeration of liquids.

Prior art spargers have had problems and disadvantages associated at least in part with the materials used. When a sparger is to be used for medical purposes, uniform porosity, sterilizability and lack of toxicity are important. Toxicity can be a problem when the sparger material or binder, e.g., metallic or resinous materials, or components thereof, dissolve in or cause changes in the medical solution or body fluids being aerated.

It is also difficult to obtain uniform porosity throughout a sparger incorporating thermoplastic materials due to the plastic nature of the material, especially when the material is warm pressed under pressure. Warm pressing of thermoplastic spheres generally results in a distortion of the spheres. The resulting nonuniformly distributed porosity causes nonuniform bubbles during use of the spargers. Blood spargers present an especially difficult problem since many substances, although inert, will cause reactions in the blood or cause clotting, e.g., glass initiates clotting when in contact with blood for a time.

Spargers made of refractory ceramics or sintered powder metal have good temperature resistance; however, many of the metallic materials corrode or could result in toxic products in liquids aerated for medical purposes. Additionally, the cost of forming refractory or powdered metal spargers is considerably greater than when less expensive materials, such as glass, are used due to the higher cost of metal and refractory powders and the higher temperatures and increased costs necessary to properly sinter refractory or metal powders together. It has also been difficult to form refractory or powdered metal materials which have uniform porosity, especially where the spargers are a complex shape, since pressing of the metal or refractory powders results in differential die forces within the pressing cavity causing a nonuniform porosity in the finished article.

U.S. Pat. No. 3,166,615 describes a method for forming porous rigid structures in which solid particles are coated with a very thin film of fluid thermosetting resin and before the resin hardens, a structure is formed by pressing a mass of such particles into contact with each other displacing the resin film from the point of contact without filling the interstices between the particles. The resin is then cured. It appears that under these circumstances, the resin being in a fluid or perhaps glassy state, draws up into a meniscus between the particles near the points of contact. Little, if any, resin appears to remain over the surface of the particle. The result is that the body thus formed probably depends for its strength in tension or bending stress mainly upon the bond between the particle surface and the resin. All the particles are said to be in direct contact with each other throughout the porous mass thus formed.

SUMMARY OF THE INVENTION

This invention relates to spargers, i.e., devices for aeration of fluids. Such devices are used in apparatus for the carbonation of beverages or for the treatment of sewage. In a further and preferred aspect, this invention relates to devices for the oxygenation of blood for medical purposes.

Broadly speaking, it has been found that a sparger can be formed from a mass of uniformly sized glass beads which are individually coated with a solid, uncured thermosetting resin. The mass of coated particles is placed in a mold and subjected to pressure just sufficient to adhere the coated particles to each other leaving interstices between them. The resin is then cured whereupon the particles are enclosed in a resin matrix which completely surrounds each particle, is confluent at the point of contact and which has interconnecting passages throughout formed by the interstices between particles. A sparger device formed from this matrix has uniform porosity and provides uniform bubbles over substantially its entire outer surface even at low pressure differentials. In addition, the spargers of this invention have improved strength and temperature resistance as well as resistance to flaking and spalling.

BRIEF DESCRIPTION OF THE DRAWINGS

A further understanding of the invention may be had by referring to the accompanying drawings in which like reference numbers are used to denote like parts and in which.

DETAILED DESCRIPTION OF THE INVENTION

Figure 1:
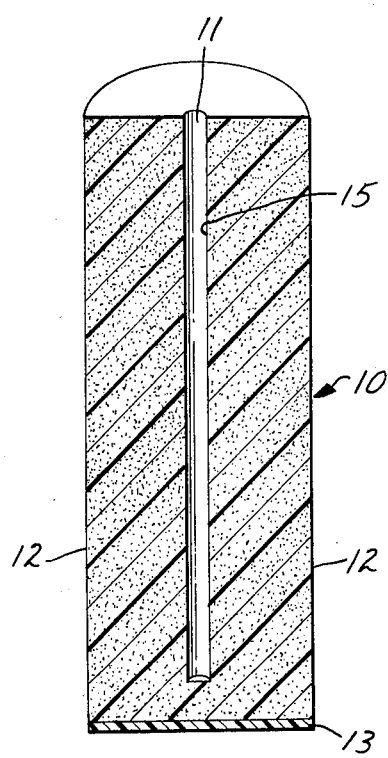
FIG. 1 is a perspective view in section through the largest diameter transversely to and along the length of the major axis of a cylindrical sparger made in accordance with this invention.

Referring to the accompanying drawing and initially to FIG. 1, a sparger 10 of generally cylindrical form and having a centrally located bore 15 is formed from spherical particles contained in a thermosetting resin. The sparger 10 has an inlet 11 by which a gas can be introduced into bore 15. When immersed in a liquid and a gas under pressure is introduced into a central opening or bore 15, the gas flows through the sparger 10 to the outer surface 12 forming bubbles in the liquid. As shown sparger 10 has a gas-impermeable layer of resin 13 cured on and covering the end of the sparger opposite the inlet 11 thereby preventing the formation of bubbles on that end.

Figure 2:
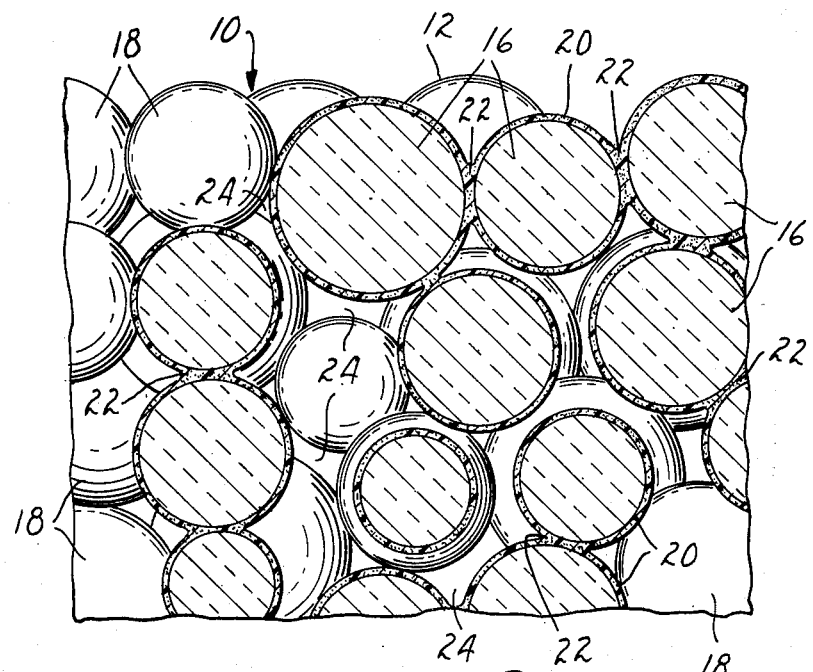
FIG. 2 is a representation of a photomicrograph of a mounted cross section of spherical particulate material in a thermosetting resin matrix which forms the sparger of FIG. 1. A portion of the matrix is embedded in a suitable resin. The mount thus made is then ground to present a flat face in which the spherical particles have been ground down to the plane of the cross section so as to show the relationship of the resin matrix, the spheres and void spaces. The spherical particles of the portion of the matrix below the plane of section are shown to a depth of two or three sphere diameters.

In FIG. 2 a portion of sparger 10 is shown embedded in mounting material for microscopic observation with one surface ground off to a plane and seen as viewed under a microscope with magnification of 50 diameters. The variation in diameter of the bead shown in cross section is caused by the difference in the amount of the bead extending above the surface before grinding. Originally the particles were of substantially the same diameter with some variation. Spherical glass particles or beads 16 having a diameter of about 540 microns are integrally bonded to each other and to other beads 18 located below the plane of grinding by a thermosetting resin matrix 20 which as shown coats and surrounds each bead and is confluent at the points of contact 22. Interstices 24 are free from resin and are interconnected forming interconnecting passages throughout the sparger and terminating at the surface. Surface 12 is formed by resin covered spherical particles and therefore presents a typical "pebbly" appearance with openings between the particles where the interconnecting passages in the body of the sparger terminate at the surface.

For making the sparger of this invention, many types of particulate material, such as glass, ceramics and metal, preferably smooth-surfaced substantially spherical particles, can be bonded together by use of various thermosetting resins.

Spherical particles are preferred since they are free flowing and conform readily to molding cavities which allows the formation of spargers with more complex internal and external rather than simple right cylinders or the like.

The preferred starting material for the composite filter body consists of substantially spherical (spheroidal) glass beads. Glass beads having average or mean diameters in the range of 30 to 900 microns and spheroidal in shape are available allowing the formation of spargers having uniform porosity in a variety of micronic ratings. For my particular purpose the particles are selected to be within a relatively narrow size range, i.e., substantially all of the particles having diameters + or −20 percent of the mean diameters. However, because glass beads are sized by screening methods, the actual spread of diameters may be somewhat greater. As used herein, "substantially uniform" means the spheroidal particles generally of such size range, but not containing many particles of much greater or much smaller diameter as these would tend to increase the packing density to an undesirable degree.

The beads are coated with a solid thermosetting, but uncured resin. This can readily be done by first coating them with a tacky resin and then overcoating with a nontacky, uncured or partially cured thermosetting resin system as described in U.S. Pat. No. 3,175,935. The epoxy resin system can also be deposited from solvents, the solvent being evaporated to leave a solid, nontacky coating of uncured resin on the particle, e.g., by utilizing fluidized bed coating techniques or the like. The glass beads when so coated are a dry, free-flowing mass having particulate cores adherently coated with a solid, nontacky thermoadhesive. The amount of resin used is from 10 to 15 percent or more by weight of the particles. Smaller beads or particles have more surface and therefore require the larger amount of resin. Because the mass of coated particles used to form a sparger or molded body in the process of this invention is not subjected to extreme pressure, the resin displaced in the molding step is substantially less in volume than that needed to fill all the spaces between the glass beads calculated on the volume of the beads.

The pore size of the molded articles of the invention is measured in terms of "micronic rating" as described in ASTM E 128-61. Porous bodies with a high micronic rating are made with the large diameter beads and vice versa.

Representative thermosetting resins which can be used to coat the particulate material used in this invention include epoxides (such as those based on epichlorohydrin and bis-phenol A, epoxy-novolak resins and cycloalaphatic epoxy resins), polyesters, polyurethanes, polyisocyanurates and phenolics. U.S. Pat. No. 3,175,935 discloses particularly useful epoxy resins for this purpose. Reference is also made to a compilation of resins useful in the practice of this invention in *Plastics Engineering Handbook*, Rhinehold Publishing Corporation, Third Edition (1960), pp. 8–39.

The coated particulate material is used to form the sparger configuration desired. Prior to pressing in a die or mold, a small amount of a lubricant such as glycerol, peanut oil, mineral oil or liquid wax can be added to the resin-coated glass beads to aid in the pressing step. Such lubricants can be added in the range of 0.1 to 5 percent based on the weight of the glass beads with a preferred range being 0.5 to 1 percent.

The mixture of coated particles and lubricant is pressed into the die employing constant pressure. This operation can be performed in a single or double action die. The pressures utilized in the practice of the process of this invention are generally from about 0.35 to 3515 kg/cm$^2$ with a preferred range of pressures being from 1 to 350 kg/cm$^2$.

In general, the lower pressures are used so as to keep the die wall friction and particle-to-particle friction to the lowest possible levels and to avoid displacing the resin coating from the beads at the point of contact. Ideally, only sufficient pressure is used to ensure that each of the coated particles is in contact with other particles and to adhere the coated particles to each other at the points of contact.

The temperature of the die cavity during the pressing step is generally elevated, being in the range of from 40° to 230°C with a preferred temperature range being between 65° and 120°C. Some curing may be initiated during the pressing, particularly when higher temperatures are used.

After thus pressing to form a green article, the green body can be removed from the mold for curing or cured in the mold with pressure released. The thermosetting resin coat on the glass beads is cured as by heating the green article to the curing temperature for several minutes to 24 hours depending upon the type of resin, a practically preferred cure cycle ½ to 4 hours. Many of the commercially available epoxy resins have a cure cycle of ½ to 1 hour at about 190°C and have been found satisfactory to form an integrally consolidated structure containing numerous interconnecting passageways and suitable for spargers. The curing temperature at which the cure cycle is carried out will generally be from about 90° to 260°C with a preferred range of 170° to 230°C.

During the cure cycle, the resin softens, flows to become confluent at the points of contact between particles and cures around the particles to form a matrix which bonds the particles together. The coating of cured resin remains on the surface of the particle, thus serving to surround and separate the particles.

In order to maintain structural shape during curing, it may be desirable after removal from the mold to support the green structure in a bed of coarse refractory material during the curing cycle. Examples of suitable supporting materials include coarse alumina, silica, magnesia or sodium chloride. The type of refractory used is not critical in most cases as the temperatures used for curing of the thermosetting resins are considerably below those temperatures at which the refractory material begins to sinter and such supporting materials are readily chosen to be nonreactive with the thermosetting resins employed.

The glass beads useful in the practice of this invention, particularly when pressed with a lubricant, conform readily to complex mold geometrics and may be used to press spargers having internal cavities. However, it may be desirable in some instances to warm press a porous block of coated particulate material and cure the resin forming a block suitable for further machine forming. The cured article may be drilled or machined using conventional machining techniques well known in the art without significantly impairing the surface of the machined article. Normally, machining operations "smear" the surface leaving deposits of material which have been deformed on the surface of the machined article and impair the porosity on the machined surface. No such smearing is observed in the spargers of this invention which have been machined from a cured block of glass bead-epoxy resin composite owing to the brittle nature of the composite.

In some cases, it may be desirable to seal a portion of the sparger, such as one end, to make a portion of the sparger gas impermeable. For example, in blood oxygenation, it is desirable to have the bubbles flow only from the lateral surface of the sparger and to have few if any bubbles escaping from the end surface of the sparger. The sparger of this invention may be selectively rendered nonporous over portions of the sparger tube by sealing with a thermosetting resin, such as those resins hereinbefore described as useful in forming the matrix which consolidates the particulate material. The thermosetting resin may be applied to the formed sparger and then cured in a separate step or may be applied prior to the curing cycle and cured at the same time as the green sparger is cured. The resulting sparger forms uniform bubbles in the nonsealed portions of the sparger but exudes few if any bubbles from the sealed portions.

The bubbles emitted from the spargers of this invention at any given pressure drop are a function of the pore size (size of the interconnecting passageways) of the matrix. The pore size in the articles of this invention is essentially dependent upon the size of glass beads; however, the porous nature may also be a function of the pressure applied during molding, amount of the resin coating applied to the glass beads or the resin coating compositions used.

The process employed and the spargers thereby produced are further illustrated by the following examples in which all parts are by weight unless otherwise stated. The spargers have been assigned a pore size rating based on a bubble point test as set forth in ASTM E 128-61.

EXAMPLE 1

One hundred parts of spherical glass beads having mean diameter of 200 microns (size range 177–250 Microns) were coated with 15 parts of a thermosetting epoxy resin (available as "Scotchkote" 112, described in U.S. Pat. No. 3,175,935 together with the process for coating the beads) and the resulting thermosetting epoxy resin-coated beads were blended with ½ part glycerin.

The mixture was warm pressed at 82° C. in a double action die at a pressure of 280 kg/cm² for ½ minute. The resulting cylinder was ¾ inch (1.9 cm.) in diameter by 2½ inches (6.35 cm.) in length. The cylinder was coated on one end by adding additional thermosetting resin to the top of the mold and repressing the structure at 280 kg/cm² and 82° C. for about 5 seconds. The resulting green molded cylinder was supported in a bed of coarse-grained alumina and cured in an air furnace at 190° C. for ½ hour. A portion of the resulting cylinder was cut from the uncapped end leaving the cylinder 2⅛ inches (5.39 cm.) long. An 0.08 inch (0.20 cm.) diameter hole was drilled 2 1/16 inches (5.24 cm.) deep into the 2⅛ inch (5.39 cm.) long cylinder. The sparger thus produced was attached to an air line and submerged in alcohol to determine the bubble point. A pore size of 96 microns was calculated and the sparger exhibited a uniform flow of bubbles into the alcohol from the entire surface of the tube from end to end when subjected to a pressure of 2 inches (5 cm.) of water above the bubble point. The end seal formed by the thermosetting epoxy was impervious and no bubbles were observed.

EXAMPLE 2

Glass beads coated as in Example 1 were charged into a dual action pressing die having a length of 4¼ inches (10.8 cm.), a diameter of ¾ inch (1.9 cm.) and a stationary 0.08 inch (0.20 cm.) diameter core rod integrally attached to one of the punches. Approximately 23 grams of the coated glass beads were charged into the pressing die which was maintained at 71° C. A pressure of 3400 pounds per square inch (240 kg/cm²) was applied to the beads and maintained for approximately 15 seconds. The pressed green spargers were ejected from the die body. To produce a sparger having a sealed end, a 1/16 inch (0.16 cm.) layer of thermosetting epoxy powder was charged into the die body opposite the core rod and the structure repressed at 1,000 lbs/square inch (70 kg/cm²) load before ejection of the green sparger.

The green spargers were then cured, unsupported, in an air circulating oven at 230° C. for 2 hours to ensure complete cure of the resin.

Sparger tubes produced in this manner were bubble point tested and the pore size found to be 96 microns. Increasing the pressure to ½ inch (1.3 cm.) of water over the bubble point pressure resulted in uniform bubbling from end to end.

EXAMPLE 3

One hundred parts of glass beads having a mean diameter of 700 microns (size range 595–841 microns) were coated with 15 parts of thermosetting epoxy resin as in Example 1. One-half part glycerin was hand-blended into the mixture as a lubricant to insure uniform pressing Four hundred thirty grams of the resin coated bead mixture was charged into a preheated (82° C.) dual action pressing die having a length of 15 inches (38.1 cm.), a 2 inch (5.08 cm.) outer diameter and a 1½ inch (3.81 cm.) by 15 inch (38.1 cm.) diameter mandrel. A pressure of 730 pounds per square inch (51 kg/cm²) was applied to the die punches and maintained for approximately 1 minute. The pressed green sparger was then ejected from the die body and the mandrel removed from the sparger. The sparger was supported upright in a bed of 8–14 mesh (U.S. Sieve Size) alumina and cured in an air circulating oven at 191°C. for 2 hours resulting in a completely cured sparger tube.

The sparger tube produced in this manner was bubble point tested and pore size was determined to be 391 microns. Increasing the pressure to 1 inch (2.54 cm.) of water over the bubble point pressure resulted in uniform bubbles from end to end.

EXAMPLE 4

Several sparger tubes were fabricated from resin coated glass beads having a mean diameter of 200 microns and coated as in Example 1. Some of the tubes were fabricated using beads to which ½ percent glycerol was added as a lubricant and some tubes were fabricated without the use of a lubricant. The resulting beads were pressed in a double action cylindrical pressing die as in Example 2 employing a constant pressure of 4400 pounds per square inch (310 kg/cm$^2$) for all the tubes. Dwell time at pressure for the tubes was approximately 15 seconds. Pressed tubes were then cured in a supporting bed of crushed alumina for 45 minutes at 190°C. Data for the resulting tubes is tabulated in TABLE I.

TABLE I

| Tube | Lubricant | Die Temperature °(C.) | Bubble Point (cm H$_2$O) | Comments |
|---|---|---|---|---|
| 1 | none | 25 | 10.2 | Bubbling at center |
| 2 | none | 71 | 10.8 | Bubbling conc. at center |
| 3 | ½ percent | 25 | 10.2 | Bubbling conc. at center |
| 4 | ½ percent | 71 | 12.7 | Bubbling dispersed along entire sparger |

The sparger tube prepared with a lubricant and pressed at an elevated die temperature produced a sparger tube which had a more uniform bubble production throughout its length.

EXAMPLE 5

Glass beads having a mean diameter of about 150 microns were coated with a thermosetting resin by means of a solvent deposition technique. The thermosetting resin, 200 grams of an epoxy resin containing bis-phenol A and epichlorohydrin (available as "Scotchkote" 112), was dissolved in 500 milliliters of methyl ethyl ketone solvent and the resulting solution blended with 2000 grams of the glass beads. The methyl ethyl ketone was volatilized during the mixing depositing a smooth, evenly distributed layer of the resin on the beads' surface.

The coated beads were placed in a tube mold 18 inches (45.7 cm.) long and 2-¼ inches (5.71 cm.) in diameter having a circular insert 18 inches (45.7 cm.) long and 1-½ inches (3.81 cm.) in diameter at the center of the die cavity. The filled mold was vibratorily compacted and the mold and bead compact heated to 176°C. in air and held for 1 hour to cure the resin. Upon cooling the mold was removed and the resulting tubular sparger was bubble point tested. The sparger had a bubble point of 63 microns and showed uniform porosity.

What is claimed is:

1. A sparger comprising a porous body provided with gas inlet means, said body consisting of a matrix of cured thermosetting resin containing and connecting a mass of uniformly sized, solid, substantially spherical particles of a size in the range of about 30 to 900 microns in diameter, said resin being present in amount of 10 to 15 parts by weight for each 100 parts by weight of particles, said body being formed by consolidation of the resin coating said particles and confluent at the points of contact of said particles which particles are uniformly coated over their entire surfaces with said resin in solid state and are adhered in the presence of an inert lubricant under pressure just sufficient to adhere the coated particles at points of contact with each other without causing flow of resin to fill the interstices between coated particles, the surfaces of said joined particles being coated with said resin to substantially the same thickness as originally deposited thereon and the cured resin defines a unitary matrix surrounding each of said spherical particles and containing numerous interconnecting passageways therethrough formed by the interstices between said resin-coated particles which passageways function as means for conducting gaseous flow from the said inlet means through said porous body to the surfaces thereof.

2. A sparger comprising a porous body provided with gas inlet means in the form of a central opening into said body, said body being composed of a mass of solid, substantially spherical particles of substantially uniform diameter in the range of 30 to 900 microns uniformly coated with and adhered to each other by a layer of cured thermosetting resin in amount of about 10 to 15 parts by weight for each 100 parts of particles, the said resin extending over the entire surface of each of said particles and confluent at the points of contact of said particles thus forming a rigid, uniformly porous body with the interstices between said coated particles forming numerous interconnecting passageways throughout said body and extending from said central opening to the outer surface thereof and functioning as a means for conducting gases from said inlet means through said porous body to the outer surface of said body.

3. The article of claim 2, wherein said particulate material is glass beads.

4. The article of claim 2, wherein said thermosetting resin is an epoxy resin.

5. The article of claim 2, wherein said thermosetting resin is a cyanurate resin.

6. The article of claim 2, where a portion of the outer surface of said body is selectively sealed by a cured thermosetting resin.

* * * * *

UNITED STATES PATENT AND TRADEMARK OFFICE
CERTIFICATE OF CORRECTION

PATENT NO. : 3,978,176
DATED : August 31, 1976
INVENTOR(S) : Douglas W. Voegeli

It is certified that error appears in the above—identified patent and that said Letters Patent are hereby corrected as shown below:

Col. 3, line 26, after "external" the word -- geometries -- should be inserted.

Col. 5, line 63, "Microns" should be -- microns --.

Signed and Sealed this

Fifteenth Day of February 1977

[SEAL]

Attest:

RUTH C. MASON
Attesting Officer

C. MARSHALL DANN
Commissioner of Patents and Trademarks